Figure 1:
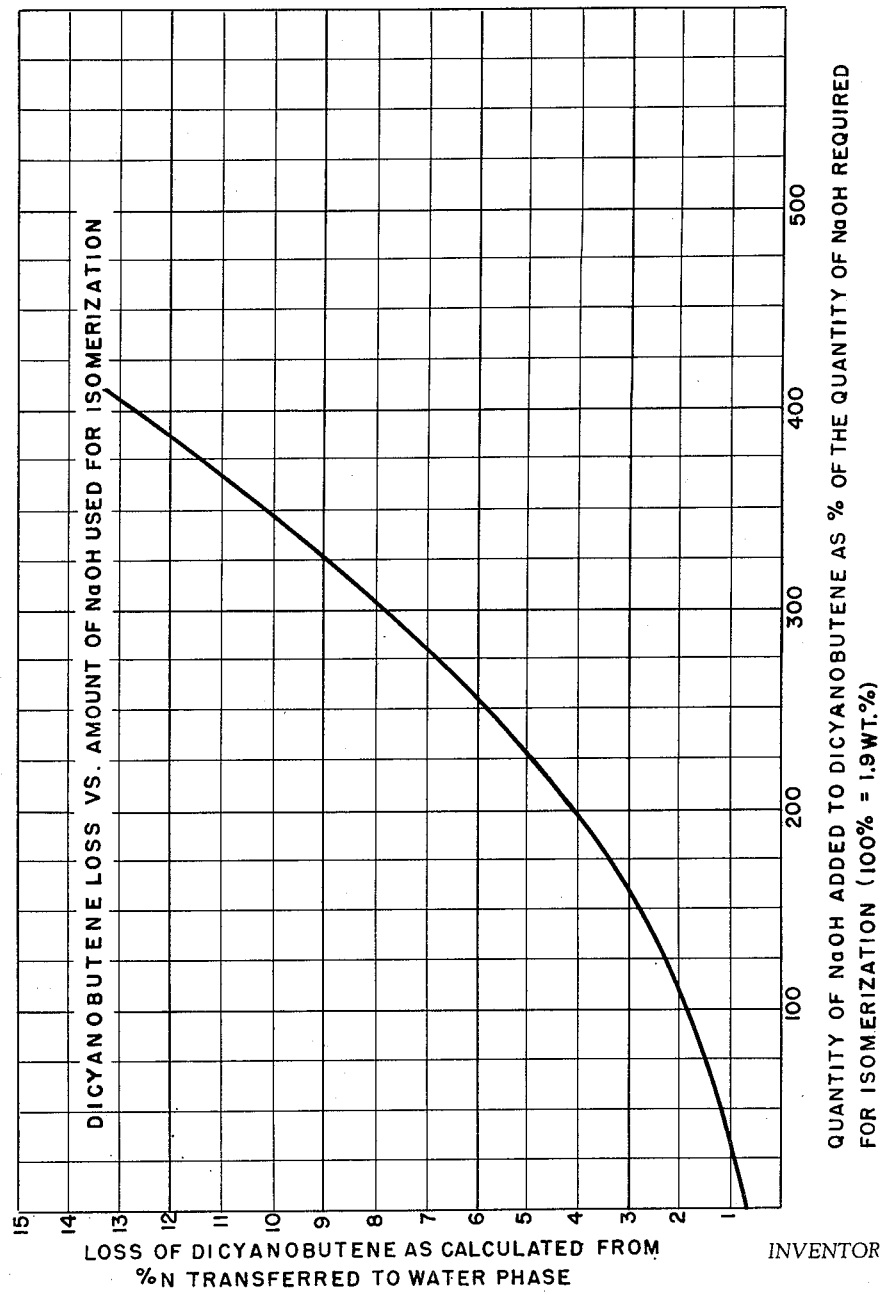

INVENTOR
MARTVAL JOHN PAUL HARTIG
BY
ATTORNEY

United States Patent Office 2,695,912
Patented Nov. 30, 1954

2,695,912

ISOMERIZATION OF 1,4-DICYANO-2-BUTENE

Martval John Paul Hartig, Orange, Tex., assignor to E. I. du Pont de Nemours and Company, Wilmington, Del., a corporation of Delaware Application June 17, 1953, Serial No. 362,309

3 Claims. (Cl. 260—465.8)

This invention relates to processes which involve the step of isomerizing 1,4-dicyano-2-butene to a mixture of isomers which are liquid at temperatures in the range of 2° to 8° C.

For several years it has been known that 1,4-dicyano-2-butene is obtainable by cyanation of 1,4-dichlorobutenes, e. g. by the method of U. S. 2,324,101 or by the more recently disclosed cyanation processes involving reaction between 1,4-dichlorobutenes and HCN in the presence of aqueous hydrochloric acid and a dissolved copper catalyst (U. S. Patents 2,477,617, 2,477,672, and 2,477,674). The crude products obtained in the latter processes have been contaminated with small amounts of 1,4-dichlorobutenes. By careful distillation of the crude products thus obtained it has been possible to prepare relatively pure crystalline 1,4-dicyano-2-butene which is virtually free of 1,4-dichlorobutenes. The highly selective fractionation required in this distillation process is quite costly, not only because it requires an efficient fractionating column, and yields a normally solid product, but more particularly because the mixture is highly corrosive to mild or stainless steels.

In the Langkammerer patent, U. S. 2,487,285, it was disclosed that 1,4-dicyano-2-butene could be isomerized to a liquid isomer, namely, 1,4-dicyano-1-butene, by heating a mixture of 1,4-dicyano-2-butene and an amine having a pKa value at 20°–25° C. between 6 and 12. The quantity of amine generally employed according to the Langkammerer process was between 0.8 and 2% of the weight of 1,4-dicyano-2-butene. To obtain a product which is liquid at relatively low temperature and which is non-corrosive, Grigsby and Bloom (U. S. 2,570,794) have recently devised a process for removal of specific chlorine-containing compounds which cause corrosion (especially 1,4-dichlorobutene as contrasted with certain less active chlorobutenes which when present in trace quantities were not so harmful). In the Grigsby and Bloom process the crude nitrile, contaminated with the chlorine-containing impurities, was treated with an amine of the class consisting of trimethyl and triethylamine at a temperature of from 90° to 180° C. in the liquid phase, whereby the amine reacted with the chlorine-containing impurity to produce a water-soluble product which could be extracted from the resulting mixture. The Grigsby and Bloom process produced a non-corrosive product, containing however small traces of methylamine or triethylamine, but no free HCl. These trace amounts of tertiary amine, it has now been found, were highly beneficial, because they assisted in preventing corrosion of mild or stainless steel by trace amounts of hydrogen chloride precursors still remaining in the purified nitrile.

While as explained above the Grigsby and Bloom process was highly efficient from the standpoint of preventing corrosion and while it provided an excellent method for converting the solid dicyanobutene to a liquid isomer which could be handled more readily, it nevertheless had certain disadvantages. The chief disadvantage was, of course, the need for employing substantial amounts of a tertiary amine having a highly offensive odor. In large scale operations, this tertiary amine odor became particularly troublesome, not only because it was very difficult to suppress about the plant but also because under special conditions it gave rise to a potential air pollution problem in near-by communities.

The objective of eliminating, or greatly decreasing, the use of trimethylamine or triethylamine was a particularly difficult one to achieve, and repeated efforts to produce the desired isomerization reaction, and purification, with other alkaline materials resulted in failures. Methods which had previously been reported to be effective in the allylic rearrangement of other unsaturated nitriles were found to be unsatisfactory when applied in the purification and isomerization of 1,4-dicyano-2-butene. It had been known, for example, that 2-alkenyl cyanides could be isomerized to 1-alkenyl cyanides by contacting the 2-alkenyl cyanide in the vapor phase with an alkali or alkaline earth metal cyanide at a temperature of approximately 200° to 540° C. Because of the ease with which 1,4-dicyano-2-butene is converted to tarry products in the presence of alkaline reagents, especially at elevated temperatures, this previously known isomerization process could not be employed effectively in the manufacture of liquid isomers from 1,4-dicyano-2-butene. Repeated efforts to employ caustic solutions were ineffective for similar reasons.

In accordance with the foregoing, the problem which confronted the present applicant was to convert crude 1,4-dicyano-2-butene, contaminated with corrosive chlorine-containing impurities, to a mixture of isomers which remained liquid at relatively low temperatures, and which would be virtually non-corrosive to mild and stainless steels, or which could be made non-corrosive by relatively simple subsequent treatment.

It has been discovered in accordance with this invention that isomerization of 1,4-dicyano-2-butene to a mixture of isomers can be effected satisfactorily by treating a solution of crude 1,4-dicyano-2-butene in an inert organic solvent with a controlled quantity of aqueous alkali metal hydroxide, sufficient to maintain the pH of the water phase, measured after separation from the agitated mixture, at 10.5 to 12.0, whereby the readily hydrolyzable chlorine-containing compounds are hydrolyzed, and thereafter adding a further controlled amount of aqueous sodium hydroxide, in quantity equal to from 0.3% to 5% of the weight of dicyanobutene, and heating the mixture as hereinafter described to produce the desired isomerization.

In carrying out the process of this invention the crude dicyanobutene, contaminated with chlorine-containing impurities is first treated by addition of caustic in sufficient quantity to remove the most reactive chlorine-containing impurities. The chlorine removal reaction is extremely rapid. In this step of the process it is desirable to provide sufficient agitation to produce good contact of the caustic with the organic phase, while periodically or continuously observing the pH of the aqueous phase of the reaction mixture. The purpose of this preliminary caustic wash is to convert the most readily hydrolyzable chlorine-containing contaminants to hydrolysis products, thereby removing contaminants at a pH just below that at which causes isomerization. This preconditions the mixture for the isomerization step, which follows this preliminary caustic wash, and fixes the quantity of alkali required in the isomerization step. The quantity of alkali required is the smallest amount which is sufficient to produce the isomerization, and this is just below the quantity which produces excessive losses of dicyanobutene to degradation products. There is thus a narrow range of alkali content which can be employed effectively at a narrowly controlled range of temperature and a controlled contact time, and this becomes possible only if the mixture is preconditioned as above described.

Figure 2:
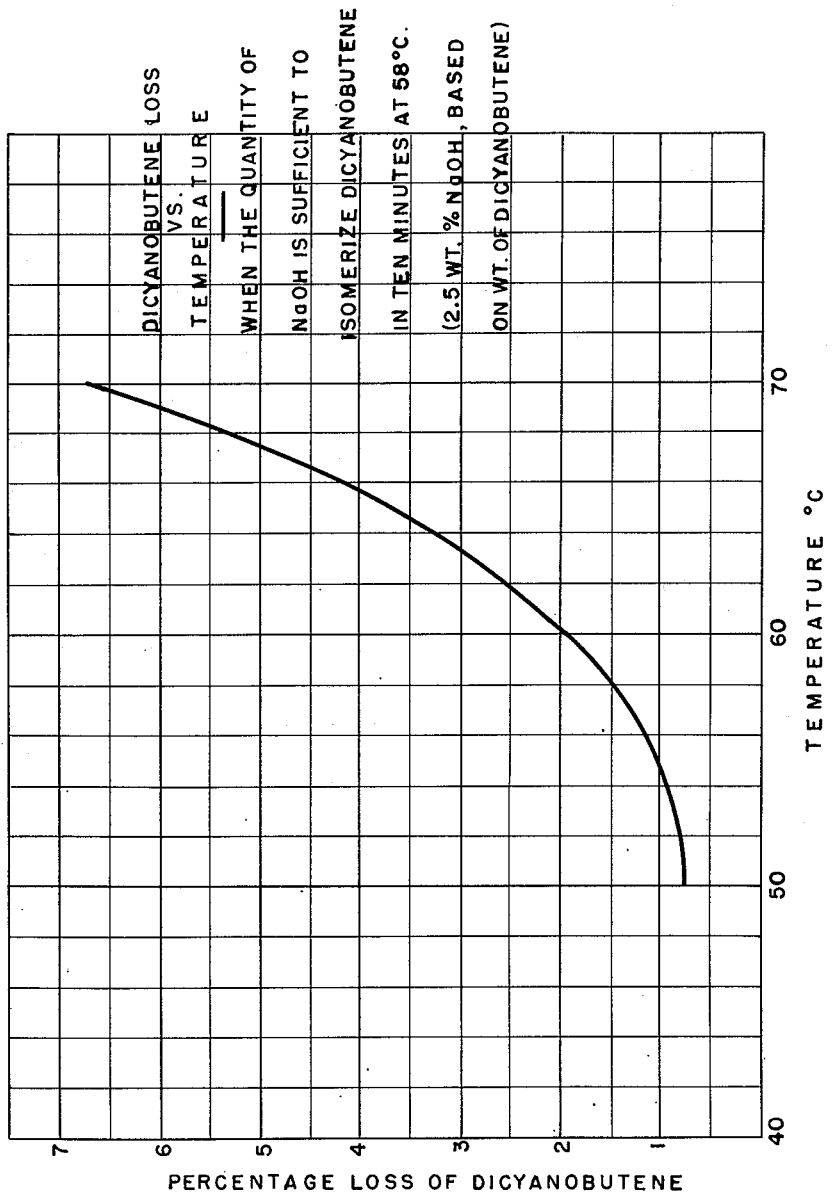

The loss of dicyanobutene to hydrolysis or degradation products depends upon the reactor temperature and the quantity of alkali metal hydroxide, as shown in the appended drawings. In Figure 1 the relationship is shown between the quantity of 10% (by weight) aqueous sodium hydroxide solution and the loss (i. e. the loss as calculated from the absorption of N into the aqueous phase) in the isomerization step. The abscissa expresses the quantity of sodium hydroxide in terms of a scale on which 100 represents 1.9% of NaOH, based on the weight of dicyanobutene, this being the quantity needed for lowering the melting point to 8° C. under the conditions of the tests, namely, a reaction temperature of 60° C., a 34% weight solution of dicyanobutene in benzene as the non-aqueous phase, and a contact time of 12 minutes. The sensitiveness of the hydrolysis reaction to reactor temperature is shown in Figure 2. In the tests reported in Figure 2, the contact time was 10 minutes and the quantity of 10% caustic was sufficient to provide 2.5% NaOH, based on the weight of dicyanobutene. The non-aqueous phase was a 34% solution of dicyanobutene in benzene. The curve shows the approximate yield loss at various temperatures due to the adverse effect of the caustic on the dicyanobutene.

Contact time is one of the variables which should be controlled if optimum results are desired. In general the isomerization is continued until the melting point of the dicyanobutene is lowered to within the range of 2° to 8° C. In nearly all instances the time required is within the range of about 5 to 30 minutes. The relative amounts of water and of inert organic liquid in the reaction system are not particularly critical and each may be varied rather widely. The degree of agitation is a variable which need not be controlled quantitatively, it being necessary however to provide sufficient agitation for ample contact between the aqueous and non-aqueous phases.

As indicated above, neither the preliminary caustic wash nor the isomerization step results in complete removal of all chlorine-containing contaminants, although these operations do result in lowering the Cl content to about 500 parts per million based on dicyanobutene. Further caustic treatment to remove final traces of these impurities tends to destroy the dicyanobutene excessively. Therefore the product obtained by applying these two steps to the crude dicyanobutene is still somewhat corrosive to mild and stainless steels. It is a product of great utility, however, for reasons which will now be explained.

The dicyanobutene, treated as above described, is not only isomerized to the desired liquid form and freed of the particular chlorine-containing contaminants which can be removed by sodium hydroxide but, what is more important, it is in a state of purity such that it can be rendered non-corrosive either by the addition of trace quantities of trimethylamine, ethylene oxide, or propylene oxide. The effectiveness of these agents appears to be a result of their reaction with the remaining traces of organic chlorides, or with any HCl produced therefrom, thus eliminating the corrosiveness to mild and stainless steels which otherwise characterizes the contaminated dicyanobutenes.

Because of these respective discoveries, it has been possible to provide a process for purifying 1,4-dicyano-2-butene and eliminating difficulties in the hydrogenation thereof (e. g. by the process of U. S. Patent 2,532,212) which involves isomerizing the crude 1,4-dicyano-2-butene, contaminated with chlorine-containing impurities which are formed in the synthesis of the said 1,4-dicyano-2-butene and HCN, to produce a liquid mixture of isomers of 1,4-dicyano-2-butene and 1,4-dicyanobutene-1 having a melting point within the range of 2° to 8° C., by agitating a solution of the said crude 1,4-dicyano-2-butene in an inert organic liquid with a quantity of aqueous alkali metal hydroxide sufficient to produce a pH of from 10.5 to 12.0 in the water phase, as measured after separation of the phases, and further admixing the dicyanobutene thus produced, dissolved in an inert organic liquid, with from 0.3 to 5% of its weight of alkali metal hydroxide in aqueous solution, agitating the resulting mixture for a period of time within the range of 5 to 30 minutes at a temperature within the range of 50° to 70° C. until the resulting isomerizaation of the 1,4-dicyano-2-butene has proceeded to such an extent that the melting point of the mixed isomers thus formed is within the range of 2° to 8° C., withdrawing from the aqueous phase, in the resulting mixture, the non-aqueous phase comprising a solution of the said mixed isomers in the said inert organic liquid.

In the process of this invention the initial treatment with aqueous alkali metal hydroxide to produce a pH of from 10.5 to 12.0, measured on a sample of the withdrawn water phase, may be performed at a temperature within the range of 0° C. (or somewhat lower, not however below the freezing point of the aqueous phase) to +70° C. The alkali metal hydroxide which is employed in the initial treatment, and also in the isomerization step, may be sodium hydroxide, potassium hydroxide, or lithium hydroxide, but sodium hydroxide is generally preferred.

The corrosiveness of the crude dicyanobutene to stainless steel without the final ethylene oxide treatment is recorded in the following table, which compares the rate of corrosion of stainless steel by a low boiling fraction of the crude, with the corresponding corrosion by a similar fraction obtained by the trimethylamine process described above.

*Corrosivity of a low Boiling Fraction of Crude Dicyanobutene (B. P. 90°/1 atm. to 150° C./100 mm.)*

| | NaOH Process [1] | Triethylamine Process |
|---|---|---|
| Laboratory Test (48 hrs., 8 g. strip) | 95 mils/yr | Nil. |
| During semiworks run (100 hrs., 11 g. strip) | 17 mils/yr | Nil. |

[1] Without ethylene oxide treatment. Ethylene oxide completely eliminates this corrosion.

The invention is illustrated further by means of the following example.

Example

A solution of dicyanobutene (produced by reaction between dichlorobutene and hydrogen cyanide in the presence of aqueous hydrochloric acid and a copper chloride catalyst) in benzene, having a dicyanobutene content of 34% by weight, was introduced into a 1 liter glass reaction vessel which was equipped with a glass stirrer and heated by means of a 250 watt infra red lamp. The mixture was titrated with 10% sodium hydroxide solution at 60° C. The pH reading of the mixture was followed by means of pH meter equipped with a calomel electrode and a glass electrode, and in addition pH tests were made on withdrawn samples from which the organic phase had been removed. The pH reading was initially 3.0 and rose rapidly upon addition of the sodium hydroxide solution to approximately 8. Here a small inflection point was encountered. Further addition resulted in a gradual rise to a pH reading of 10 at which a sharp inflection occurred, the pH reading rising to 11.5. At the latter stage, the pH of the aqueous phase after separation from the non-aqueous phase was 12.0. The quantity of sodium hydroxide consumed was equivalent to 0.271 g. of chlorine per 100 g. of dicyanobutene-benzene solution. Direct titration of the water layer with silver nitrate solution showed the presence of 0.268 g. of chlorine in the aqueous phase per 100 g. of the dicyanobutene-benzene solution employed. In a series of experiments, similar titrations were performed with a series of dicyanobutene-benzene solutions from various specimens of dicyanobutene produced by reaction between dichlorobutene and hydrogen cyanide in the presence of aqueous hydrochloric acid, and the inflection point for chlorine removal when the pH was measured on the aqueous phase from which the organic phase had been separated was always within the range of 10.5 to 12.0. From a sample of the resulting product the dicyanobutene-benzene solution was removed and charged into a reaction vessel having a capacity of 1 liter. This vessel was fully baffled, and was equipped with a stirring device capable of providing agitation equivalent to about 2.5 horsepower per 1000 gal. The mixture, which still contained in solution the solid form of dicyanobutene, was heated to 70° C. in this vessel with about 15% by weight of water added, and 19.5 ml. of 10% sodium hydroxide aqueous solution which had been preheated to 70° C. was introduced. After 24 minutes of most vigorous agitation, the product was removed, washed with water, and distilled for removal of benzene. The resulting mixture of isomers remained liquid when cooled to a temperature within the range of 2 to 8° C. In similar experiments it was determined that the quantity of 10% sodium hydroxide required to produce the liquid isomers in a reaction time of 6 minutes was 35 ml., and also that the quantity of 10% sodium hydroxide required to produce a similar liquid mixture of isomers in the reaction time of 4 minutes was 50 ml.

It is to be understood that the foregoing example is illustrative only and that numerous embodiments of the invention will occur to those who are skilled in the art. Accordingly, the invention is limited only as set forth in the following claims.

I claim:

1. A process for producing from crude 1,4-dicyano-2-butene, contaminated with chlorine-containing impurities which are corrosive to mild and stainless steels and which are present as a result of the process employed for manufacture of the said 1,4-dicyano-2-butene, namely, its synthesis from dichlorobutene and HCN, a liquid mixture of isomers of 1,4-dicyano-2-butene and 1,4-dicyano-1-butene having a melting point within the range of 2° to 8° C., which comprises agitating a solution of the said crude 1,4-dicyano-2-butene in an inert organic liquid with a quantity of aqueous alkali metal hydroxide sufficient to produce a pH of from 10.5 to 12.0 in the water layer after separation of the phases, and further admixing the dicyanobutene thus produced, dissolved in an inert organic liquid, with from 0.3 to 5% of its weight of alkali metal hydroxide in aqueous solution, agitating the resulting mixture for a period of time within the range of 5 to 30 minutes at a temperature within the range of 50° to 70° C. until the resulting isomerization of the 1,4-dicyano-2-butene has proceeded to such an extent that the melting point of the mixed isomers thus formed is within the range of 2° to 8° C., and thereafter withdrawing from the aqueous phase in the resulting mixture the non-aqueous phase comprising a solution of the said mixed isomers in the said organic liquid.

2. Process of claim 1 wherein the said agitation with aqueous alkali metal hydroxide to produce a pH of from 10.5 to 12.0 in the water phase after separation of the phases is performed at a temperature within the range of 0° to +70° C.

3. Process of claim 1 wherein the said alkali metal hydroxide employed in producing the said pH, is sodium hydroxide, and wherein the alkali metal hydroxide present in the isomerization step is also sodium hydroxide.

No references cited.